United States Patent [19]

Herndon, Jr.

[11] 4,289,510
[45] Sep. 15, 1981

[54] INTERNAL LOADING CYLINDRICAL FILTER WITH UNSUPPORTED TUBULAR FILTER FABRIC

[75] Inventor: Marion E. Herndon, Jr., Matthews, N.C.

[73] Assignee: Conor Corporation, High Point, N.C.

[21] Appl. No.: 113,453

[22] Filed: Jan. 21, 1980

[51] Int. Cl.$^3$ ............................................. B01D 46/04
[52] U.S. Cl. ...................................... 55/294; 55/350; 55/477; 55/484; 55/498; 55/499; 55/510; 55/DIG. 43; 55/DIG. 44
[58] Field of Search ................ 55/294, 301, 374, 378, 55/498–501, 510, 480, 350, 484, 477, DIG. 43, DIG. 44

[56] References Cited

U.S. PATENT DOCUMENTS

| | | | |
|---|---|---|---|
| 3,483,675 | 12/1969 | King, Jr. | 55/378 X |
| 3,832,833 | 9/1974 | Cox | 55/500 X |
| 4,154,588 | 5/1979 | Herndon, Jr. | 55/294 X |
| 4,209,311 | 6/1980 | Deeg et al. | 55/294 |

FOREIGN PATENT DOCUMENTS

| | | | |
|---|---|---|---|
| 5923 | 12/1979 | European Pat. Off. | 55/498 |
| 16392 | of 1912 | United Kingdom | 55/294 |

Primary Examiner—Kathleen J. Prunner
Attorney, Agent, or Firm—Richards, Shefte & Pinckney

[57] ABSTRACT

An internal loading cylindrical air filter apparatus having a circular tubular knit pile fabric filter element extending unsupported between end plates to provide an essentially full length unobstructed filter area, and having a rotating internal suction cleaning nozzle therefor. The tubular filter element is supported at its entry end by a detachable angle ring having a cylindrical ring flange extending through an opening in the entry end plate of the apparatus to permit endwise assembly and disassembly of the fabric filter element into the apparatus. Annular or helical strands may extend in circumferential engagement with the filter element for restraining it from ballooning out of effective cleaning distance with respect to the rotating suction nozzle under heavy filtering conditions, and a crank may be provided for adjusting the extending length of a helically extending restraining strand for controlling the degree of restaint imposed on the filter element.

5 Claims, 6 Drawing Figures

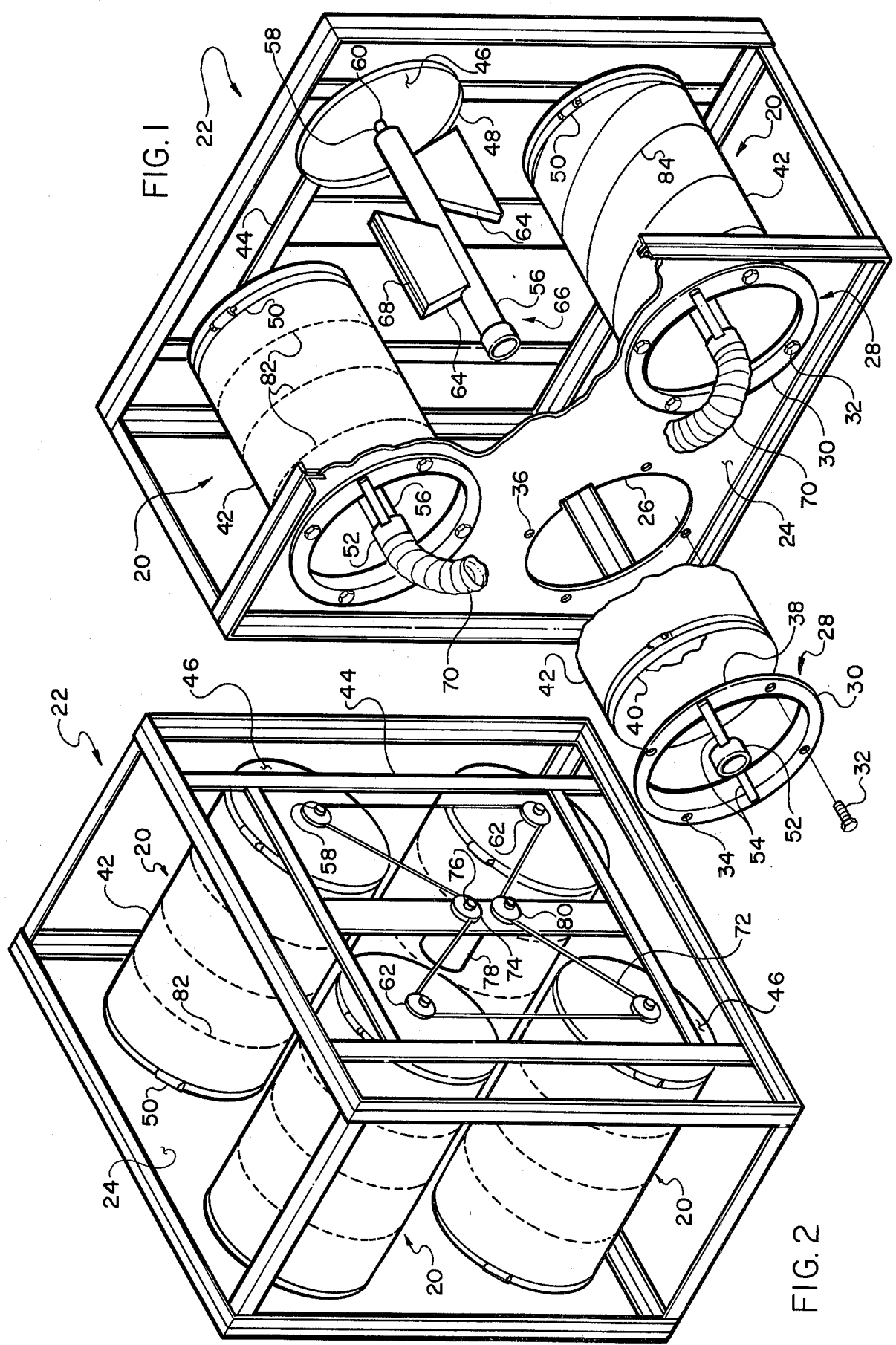

INTERNAL LOADING CYLINDRICAL FILTER WITH UNSUPPORTED TUBULAR FILTER FABRIC

BACKGROUND OF THE INVENTION

Internal loading cylindrical filters are well known, and U.S. Pat. No. 4,154,588 is exemplary of current developments in the art. This patent discloses a knit pile fabric filter element which is stretched in tubular form over a helically-wound metal rod support frame. The pile of the fabric is on the inside, and a lengthwise zipper is provided in the tubular fabric filter element for ease of assembly over the helical support. The small helically-travelling cleaning nozzle of the filter apparatus has been found not to be entirely suitable in applications where large quantities of fine wood and paper fiber are being recaptured for reuse after the fiber has been concentrated in smaller amounts of air by passage through a cyclone separator.

U.S. Pat. Nos. 1,944,267 and 1,944,268 disclose the only known unsupported cylindrical fabric filter elements with self-cleaning nozzles; however, in these patents the nozzles are of annular configuration and move lengthwise through the cylindrical filter elements, piston-like, and the axes of the cylindrical filter elements are in a vertical position for a "bag-house" application whereby it might be assumed that the long, narrow, heavy, woven, woolen tubular filter elements used for filtering purposes at that time would be relatively rigid, and that the piston-like movement of the cleaning nozzles therefore had no tendency to disturb the original cylindrical form of the filter element, but rather to maintain it. Moreover, the vertical disposition of the filter elements did not result in any tendency of such elements to bow at the center if not supported, as would be the case if the filter elements were arranged horizontally between two end plates.

Two additional U.S. Pat. Nos. 1,995,648 and 2,057,446, having the same inventor as the last-mentioned pair of patents, disclose vertical cylindrical filter elements in which the filter medium is a fibrous material such as steel or mineral wool, and the medium is fastened to a supporting screen or wire mesh cover for greater strength, rigidity, and durability of the filter element. In both of these patents, the cylindrical proportions of the filter elements are those of conventional drum filters, unlike bag house filter elements, and full length rotating suction nozzles serve to clean the filtered-out waste material from the interior of the filter element, with biasing means being provided to assure that the filter elements and suction nozzles stay in contact.

The present invention provides the advantage of a relatively inexpensive, very flexible knit fabric filter medium having a pile component which provides a "surface loading" filter effect wherein the pile fibers lie down as the dirty air passes through the filter element from the pile side, thereby trapping the waste dust or fibers on the surface; then, as the suction nozzle passes, the pile fibers are sucked up perpendicular to the filter element and the waste material is easily and thoroughly sucked therefrom. The knit filter element in tubular form is quite flexible and can be readily stretched taut between the end plates of the filter apparatus to assume a cylindrical shape in which the internal rotating cleaning nozzles are adjacent the knit fabric, and the filter element may be assembled in place from the ends of the filter apparatus without need for access from the sides thereof (which are usually inaccessible due to the typical "built-in" arrangement of the filter apparatus), with a unique end support structure being provided for the filter element to permit this ease of assembly. In some cases of extremely heavy waste build-up inside the filter element, the force of air passing through the knit fabric element causes it to have a tendency to "balloon" out of its normal taut cylindrical shape, and, in accordance with a further feature of the present invention, restraining circumferential flexible strands may be used to restrain the filter element from such ballooning tendencies so that the rotating nozzle may clean it suitably.

SUMMARY OF THE INVENTION

More specifically, the present invention provides an internal loading cylindrical air filter apparatus that includes a pair of end plate members arranged in spaced relation to one another, a rotating cleaner nozzle mounted between the end plate members for rotation about a horizontal axis in engagement with bearing means located on said apparatus for said rotation and including radially extending suction conduits drive means for rotating said nozzle, and a fabric filter element disposed in generally circular tubular form to extend between the end plate members and about the rotating cleaner nozzle adjacent the radially extending conduits, the filter element being supported solely at the end plate members and extending tautly therebetween with the portion of the filter element between the end plate members being unsupported and unencumbered for providing an unobstructed filtering area internally thereof for air passed outwardly therethrough between the end plate members, the area being thoroughly cleaned during the rotation of the rotating cleaner nozzle.

Preferably, as noted above, the filter apparatus includes restraining strand means extending in generally external circumferential restraining engagement with the tubular filter element for restraining the element against excessive ballooning as a result of the passage of air therethrough, and the strand means may extend annularly or helically relative to the tubular filter element, which is preferably formed from knit pile fabric. Means may also be provided for adjusting the extending length of the helically extending restraining strand means for controlling the degree of the restraint imposed upon the tubular filter element thereby, and the adjusting means may include a fixed anchoring means disposed on one of the end plate members for anchoring attachment thereat of one end of the strand and a rotating crank means disposed on the other end plate member for attachment at the other end of the strand whereby rotation of the crank means will adjust the extending length of the strand.

In the preferred embodiment of this invention, the end of the tubular filter element adjacent one of the end plate members finds support on annular means extending inwardly of the end plate member from ring means having means for retention thereof at the end plate member, and the apparatus has means for attaching the filter element to the inwardly extending annular support means during temporary disposition of the support means exteriorly of the end plate member for permitting assembly of the filter element into the filter apparatus endwise thereof where the interior of the filter apparatus is inaccessible laterally thereof.

BRIEF DESCRIPTION OF THE DRAWINGS

FIG. 1 is a partially broken away and partially exploded perspective view of a module of four cylindrical filters according to the present invention;

FIG. 2 is a rear perspective view of the module of filters illustrated in FIG. 1;

DESCRIPTION OF THE PREFERRED EMBODIMENTS

Figure 3:
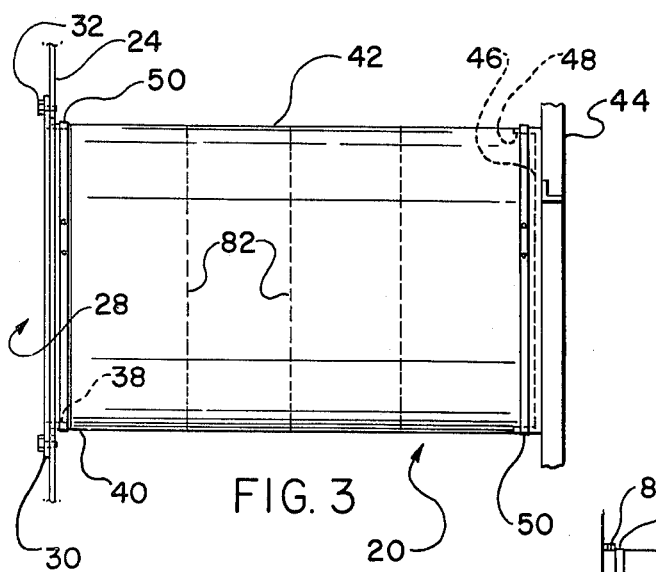
FIG. 3 is a side elevational view of a single fabric filter element assembled to the filter apparatus end plates and having annular restraining strands.

An internal loading cylindrical air filter apparatus 20 according to the present invention is typically assembled with three others into a module 22 as shown in FIG. 1. The module 22 usually rests on a floor with top and sides enclosed, such enclosures being omitted for clarity of illustration, or a number of the modules may be assembled side-by-side or stacked vertically to form filter walls of any desired shape and size. In any case, a front end plate 24 is left exposed for the entry of air through circular openings 26 therein.

At each opening 26, an annular angle ring 28 is provided, each ring 28 having an extending flange 30 for attachment or retention flat against the front plate 24 by means of headed screws 32 extending through holes 34 provided in the flanges 30 and matching mounting holes 36 provided in the front plate 24. Cylindrical flanges 38 are provided on the rings 28 for extending inwardly through the plate 24 for support of the entry ends 40 of circular tubular fabric filter elements 42 which are stretched therearound.

The rear structural framework 44 of the module 22 has attached thereto four circular end cover plates 46 having annular flanges 48 thereon extending inwardly of the module 22. The end cover plates 46 are disposed in axial alignment with, and at suitable spacing from, the openings 26 in the front plate 24. Hose clamps 50 of suitable size are used to encircle the ends 40 of the filter elements 42 for securing them over the annular flanges 38, and the filter elements 42 may then be stretched tautly through the module 22 and over the annular flanges 48 of the end cover plates 46 for securement there by additional hose clamps 50.

A tubular bearing member 52 is supported in coaxial relation with each angle ring 28 by support bars 54 attached therebetween, as by welding. The bearing member 52 supports the front end of a tubular suction manifold 56 which extends coaxially for horizontal rotation about its axis between the ring 28 and the end cover 46 and has a smaller, extending, end-plugging portion 58 which extends through an opening 60 in the cover 46 to carry at the end thereof a suitable sprocket 62 attached thereto for rotary drive of the manifold 56, the end portion being supported in the opening 60 by a bearing (not shown).

Two radially extending suction conduits 64 are attached to each manifold 56 in communicating relation with the hollow bore of the manifold 56 and extending therefrom in opposite directions for dynamic balance of the rotating cleaner nozzle apparatus 66 formed thereby. The conduits 64 are elongated in the axial direction of the manifold 56, are hollow, and extend radially therefrom so that the open ends thereof are located adjacent (in contact or in close proximity with) the internal surface of the filter element 42 thereby forming rotating cleaner nozzles therefor. Suction slots 68 at the extending ends of the conduits 64 extend parallel to the axis of the conduit 56 and are of suitable length such that upon rotation of the manifold 56, the two oppositely disposed suction slots will cover and clean essentially the entire interior surface of the filter element 42 during each revolution of the manifold 56 when suction is applied thereto.

Suction may be applied to the manifolds 56 by flexible suction hoses 70 suitably attached to the bearing members 52 and extending therefrom to a suction header (not shown) which may be connected to any convenient source of suction, such as the central suction system of a manufacturing plant. The manifolds 56 are rotated in unison by a chain drive 72 engaging each of the sprockets 62 and entrained also around an idler sprocket 80 mounted on the framework 44 for free rotation and around a drive sprocket 74 affixed to the shaft 76 of an electric gearmotor 78 mounted on the rear framework 44 of the module 22.

Annular restraining strands 82 may be sewn-in or otherwise arranged in circumferential engagement with the tubular filter elements 42 to restrain the filter elements 42 from ballooning excessively as a result of air passing therethrough. While the strands may be formed of any material that provides the necessary restraint for the filter elements, it has been found that heavy denier nylon is particularly effective with filter elements formed of knit pile fabric.

Figure 4:
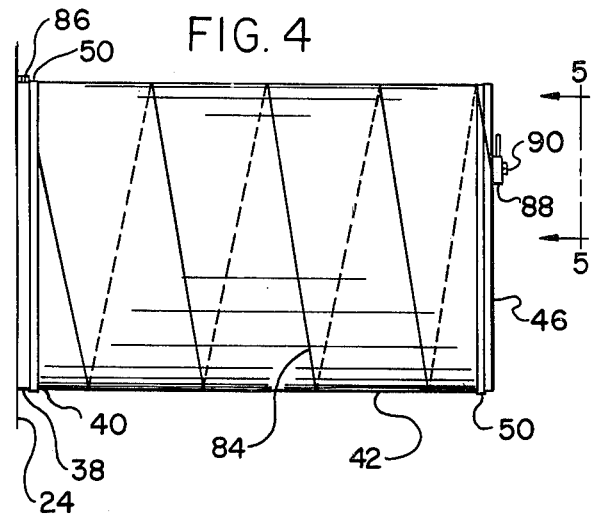
FIG. 4 is a view similar to FIG. 3 showing a restraining strand extending helically around a mounted filter element.
Figure 6:
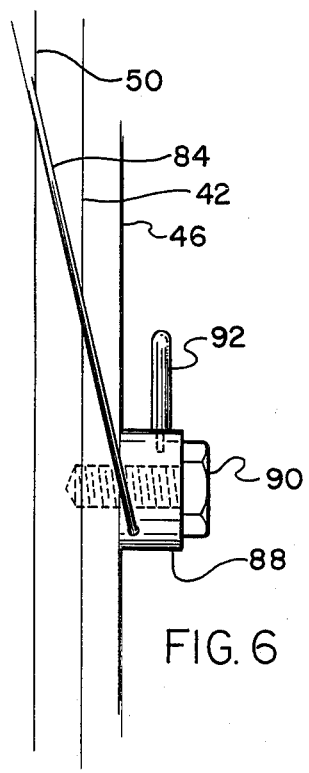
FIG. 6 is a left side elevational view of the elements of FIG. 5.
Figure 5:
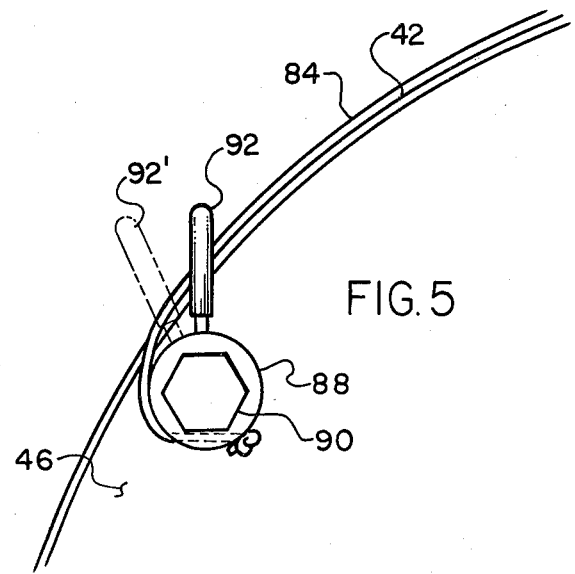
FIG. 5 is a partial elevational end view taken along the line 5—5 in FIG. 4 showing an arrangement for adjusting the length of the restraining strand.

As an alternative to the annular strands 82, helically extending strands 84 may be wrapped around or intertwined with the filter elements 42 as illustrated in FIG. 4 so that the length of helical strands 84 may be adjusted to control the degree of restraint imposed on the filter elements 42. One end of each strand 84 is anchored under a screw head 86 fixed to the cylindrical flange 38, and the other end is attached to a wind-up crank means 88 mounted for rotating on a clamp screw 90 engaged with the end cover 46 as shown in FIGS. 4, 5 and 6. Counter-clockwise rotation of the handle 92 of the reel 88 (to some other position as exemplified in broken lines at the numeral 92' in FIG. 5) adjusts the extending length of the strand 84 for controlling the degree of restraint imposed upon the tubular filter element 42 by the strand 84 to control the ballooning thereof; and when the strand 84 has been adjusted to a desired length, the crank means 88 may be locked in place by tightening the clamp screw 90.

In normal operation, air containing waste dust or fibers is blown or sucked against the front plate 24 and thereby caused to pass through the openings 26 to the interior of the filter elements 42, which are unsupported, unencumbered, and unobstructed for essentially their full lengths between the end plates 24 and 46. The air then passes through the unobstructed area of the filter elements 42 in a radial direction, thereby causing the pile fibers on the inner surface of each filter element 42 to lie down flat and form the aforesaid surface loading filter medium. After passing through the filter element 42, the now clean air may pass out through the rear framework of the module 22 or laterally thereof, depending on the particular installation. If the air is heavily loaded with dust or fibers, the rotating nozzle apparatus 66 may be operated continuously, and suction may be applied thereto continuously; but if the loading is not heavy, automatic controls (not shown) may be used to operate the suction source and the nozzle apparatus 66 only as required, to reduce power consumption, in which case the build up of waste inside the filter element may result in even better filtering. In cases where the waste build up is extremely heavy and rapid within the filter element, or unusually high air velocities are maintained, it may be desirable to provide the reinforcing and restraining strands 82 or 84 in order to prevent the filter element 42 from ballooning out to the extent that the suction nozzles are no longer close enough to clean the interior surface of the element 42.

A drawback to previous cylindrical cell internal loading filters, such as those disclosed in the aforesaid U.S. Pat. No. 4,154,588, has been the difficulty of assembling and disassembling a filter element into and out of the apparatus, and the aforesaid patent discloses a zipper running lengthwise of the tubular knit fabric filter element so that the filter element can be handled in flat form and wrapped around the helical support structure and then be zipped-up to keep it in place. In the apparatus of the present invention, it is a simple matter to disassemble the filter by loosening the hose clamp 50 at the end cover 46 from the open rear portion of the module 22, and then, from the front side of the module 22, to remove the angle ring 28 from the front plate 24, withdrawing it sufficiently to allow removal of the hose clamp 50 from the entry end of the filter element 42. Assembly is readily accomplished by reversing the process, assembling the clamp 50 over the entry end 40 of the filter element 42 while it is stretched over and supported by the cylindrical flange 38 of the angle ring 28 and while the flange 38 is temporarily disposed exteriorly of the end plate 24. The clamp 50 having been tightened to hold the filter element end 40, the angle ring 28 may be reassembled with the plate 24 to support the filter element end 40 adjacent the inside of plate 24. Then, working from the rear end of the module 22, the filter element 42 with another hose clamp 50 thereover may be pulled out and stretched over the annular flange 48 of the end cover 46 and the clamp 50 lightly tightened thereabout to hold the filter element 42 in place while it is pulled through between the clamp 50 and the flange 48 to smooth out any wrinkles and achieve suitable tautness in the tubular filter element 42 before final tightening of the hose clamp 50. This ease of assembly and disassembly is quite advantageous in that lateral access to the filter apparatus 20 and the filter element 42 may be effectively blocked by the other filter apparatus in the module 22, adjacent modules 22, or by whatever enclosing walls may surround the module 22.

The structural elements of the present invention work together to provide outstanding commercial advantages in that the use of the knit pile filter fabric permits the use of a simple relatively inexpensive support and housing structure for small internal-loading filter units which are ideally suited for multi-filter modules that may be built into building structures to form filter walls of varying sizes and shapes. The effective filter area in these filter walls is more concentrated, and such filter walls are more adaptable to existing structures than the conventional, large, cylindrical drum filters, yet they generally require less floor space.

Since the knit pile fabric may be stretched taut to support itself, the filter elements need be supported only at the ends, thereby providing a significant increase in effective filtering area as compared to conventional screen-supported elements, or even the helically-wound support of the aforesaid U.S. Pat. No. 4,154,588, where the supporting members cover a significant area of the filter element that cannot be utilized for filtering purposes and also interfere with the cleaning of the element. Also, whereas there was no convenient way to attach the knit pile fabric of the aforesaid patent to the helical support to prevent ballooning, the circumferential restraint strands disclosed herein provide simple and effective restraint in a way which could not be achieved in external-loading filters.

Elimination of any support structure except at the ends of the tubular filter element makes it possible to provide an end support structure which permits assembly and disassembly of filter elements to and from the filter units or modules thereof by endwise access alone, thereby providing a considerable maintenance advantage; and it also permits forming the filter elements permanently into tubular form, without need for the lengthwise zippers which were required for the aforesaid U.S. Pat. No. 4,154,588.

The details of the preferred embodiment described herein are for disclosure purposes only and are not intended to represent the only apparatus for internal loading cylindrical air filters which might lie within the scope of this invention, but the scope is to be determined only by the claims appended hereto.

I claim:

1. An internal loading cylindrical air filter apparatus comprising:
   (a) a pair of end plate members arranged in spaced relation to one another;
   (b) a rotating cleaner nozzle means mounted between said end plate members for rotation about a horizontal axis in engagement with bearing means associated with said end plate members for said rotation and including radially extending suction conduit means and drive means for rotating said nozzle means;
   (c) a fabric filter element disposed in a generally circular tubular form to extend between said end plate members and about said rotating cleaner nozzle means adjacent said radially extending conduit means thereof, said filter element being supported solely at said end plate members and extending tautly therebetween with the portion of said filter element between said end plate members being unsupported and unencumbered for providing an unobstructed filtering area internally thereof for air passed outwardly therethrough between said end plate members, said area being thoroughly cleaned by said suction conduit means during said rotation of said rotating cleaner nozzle means; and
   (d) restraining strand means extending in generally external circumferential restraining engagement with said tubular filter element for restraining said element against excessive ballooning as a result of the passage of air therethrough, said strand means extending helically relative to said tubular filter element.

2. An internal loading cylindrical filter apparatus according to claim 1 and characterized further by means for adjusting the extending length of said strand means for controlling the degree of said restraining imposed upon said tubular filter element by said strand means.

3. An internal loading cylindrical filter apparatus according to claim 2 and characterized further in that said adjusting means includes fixed anchoring means disposed on one of said end plate members for anchoring attachment thereat of one end of said strand means and a rotating crank means disposed on the other of said end plate members for attachment of the other end of said strand means whereby rotation of said crank means will adjust the extending length of said strand means.

4. An internal loading cylindrical filter apparatus according to claim 1 and characterized further in that said filter element is a knit pile fabric.

5. An internal loading cylindrical air filter apparatus comprising a pair of end plate members arranged in spaced relation to one another, a rotating cleaner nozzle means mounted between said end plate members for rotation about a horizontal axis in engagement with bearing means associated with said end plate members for said rotation and including at least one radially extending suction conduit, drive means for rotating said nozzle means, and a fabric filter element disposed in a generally circular tubular form to extend between said end plate members and about said rotating cleaner nozzle means and adjacent said radially extending conduit thereof, wherein the improvement comprises ring means for support of said filter element at the end thereof adjacent at least one of said end plate members, said ring means having means for retention thereof at said one of said end plate members and having annular means extending inwardly of said one of said plate members for said support of said filter element and means for attaching said filter element to said inwardly extending annular means during temporary disposition of said ring means exteriorly of said one end plate member.

* * * * *